US008092700B2

(12) United States Patent
Terui

(10) Patent No.: US 8,092,700 B2

(45) Date of Patent: Jan. 10, 2012

(54) METHOD FOR MANUFACTURING LIQUID DISCHARGE HEAD

(75) Inventor: Makoto Terui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 12/060,020

(22) Filed: Mar. 31, 2008

(65) Prior Publication Data

US 2008/0245766 A1 Oct. 9, 2008

(30) Foreign Application Priority Data

Apr. 3, 2007 (JP) ................................. 2007-097224

(51) Int. Cl.
*G11B 5/127* (2006.01)

(52) U.S. Cl. ........................................... 216/27; 438/21

(58) Field of Classification Search ........................ None
See application file for complete search history.

(56) References Cited

U.S. PATENT DOCUMENTS

| | | | | |
|---|---|---|---|---|
| 5,478,606 | A | 12/1995 | Ohkuma et al. | |
| 5,877,791 | A * | 3/1999 | Lee et al. | 347/63 |
| 2008/0090330 | A1 * | 4/2008 | Terui | 438/109 |

* cited by examiner

*Primary Examiner* — Allan Olsen

(74) *Attorney, Agent, or Firm* — Canon USA Inc IP Division

(57) ABSTRACT

A method for manufacturing liquid discharge heads having a substrate where energy generation elements that generate energy used for discharging liquid are formed, a wiring electrically connected to the energy generation elements, and a flow path communicating with discharge ports for discharging liquid and corresponding to the energy generation elements. The method includes forming a resin layer on the substrate, a first pattern for forming the wiring on the resin layer, the wiring on the substrate using the first pattern, a second pattern for forming the flow path on the resin layer, a coating layer for coating the second pattern, and the flow path by removing the second pattern.

11 Claims, 7 Drawing Sheets

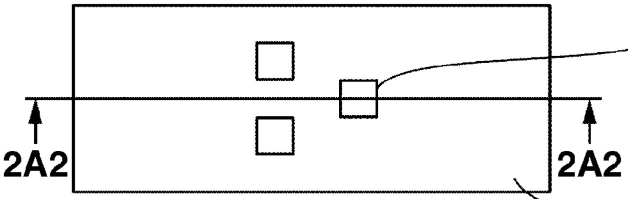
FIG.2A1
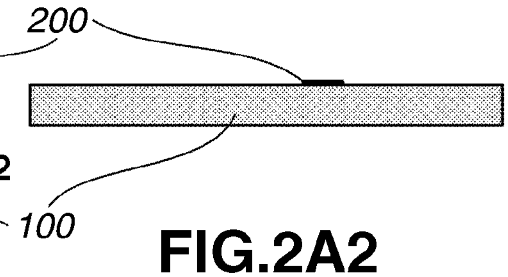
FIG.2A2
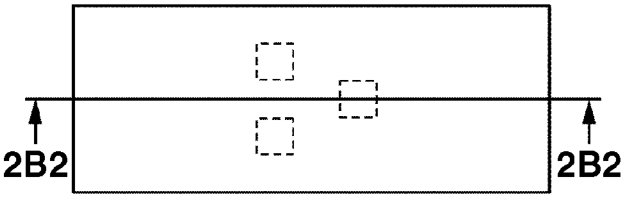
FIG.2B1
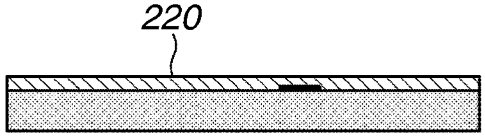
FIG.2B2
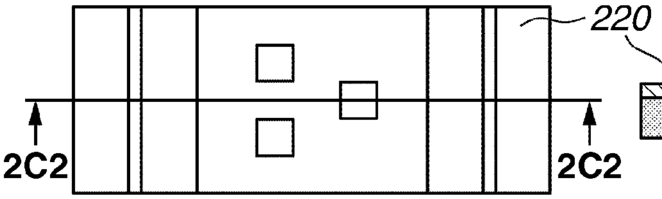
FIG.2C1
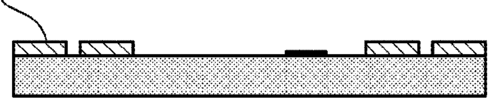
FIG.2C2
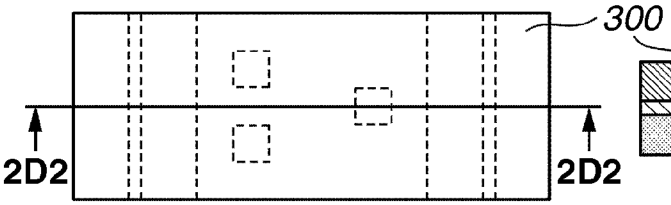
FIG.2D1
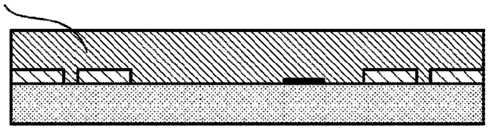
FIG.2D2
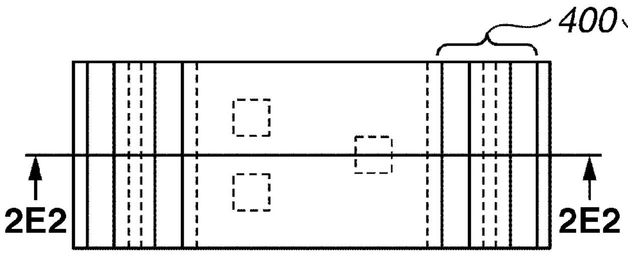
FIG.2E1
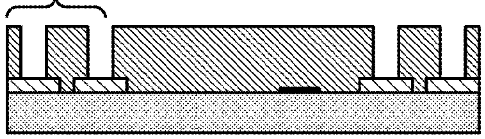
FIG.2E2

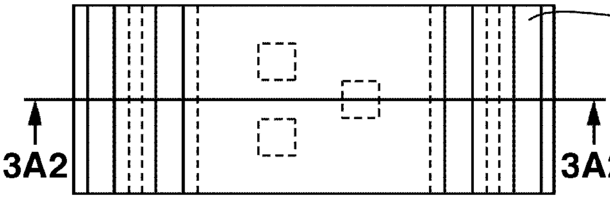
FIG.3A1
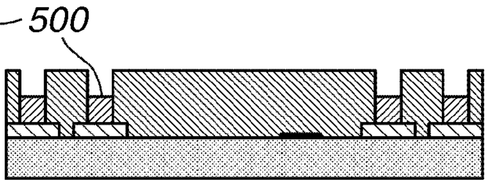
FIG.3A2
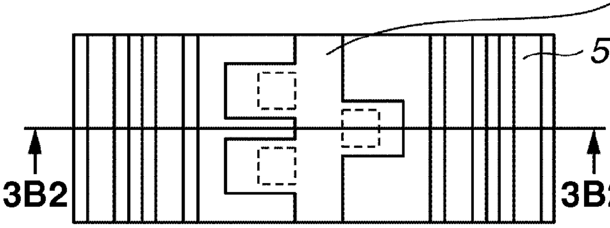
FIG.3B1
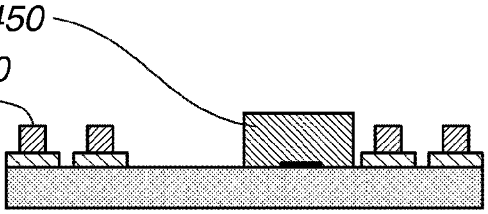
FIG.3B2
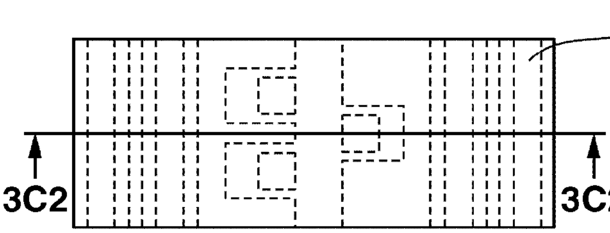
FIG.3C1
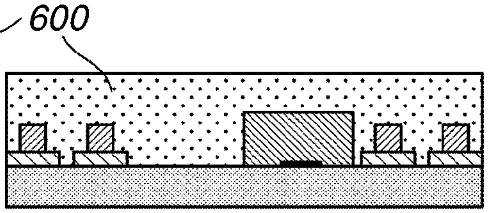
FIG.3C2
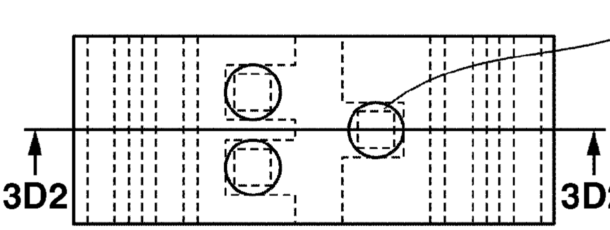
FIG.3D1
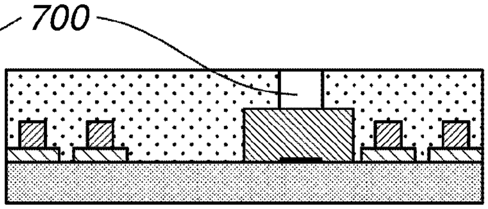
FIG.3D2
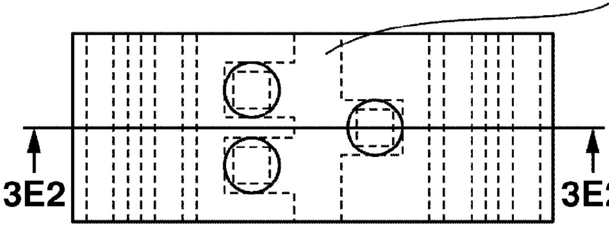
FIG.3E1
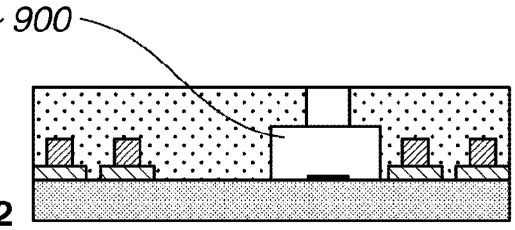
FIG.3E2

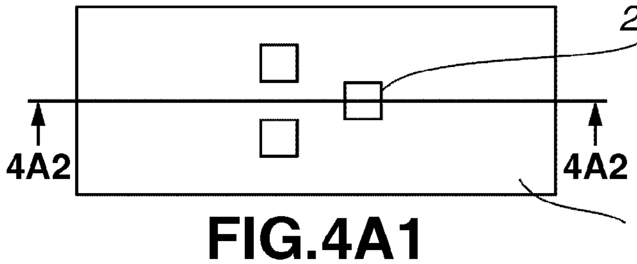
FIG.4A1
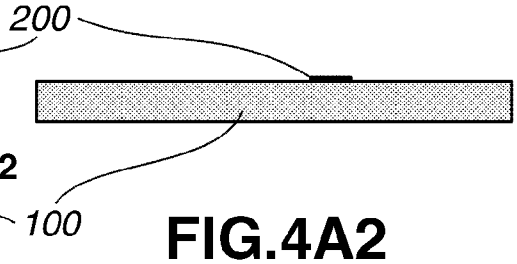
FIG.4A2
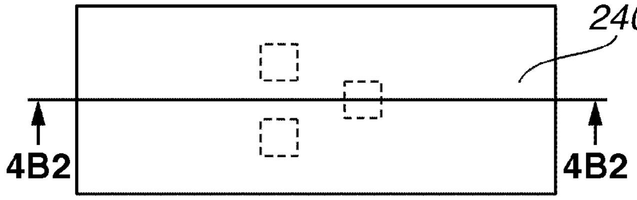
FIG.4B1
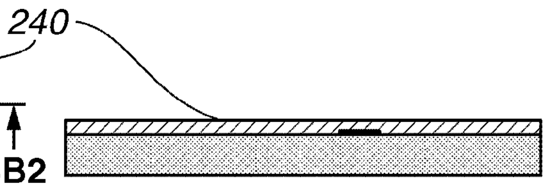
FIG.4B2
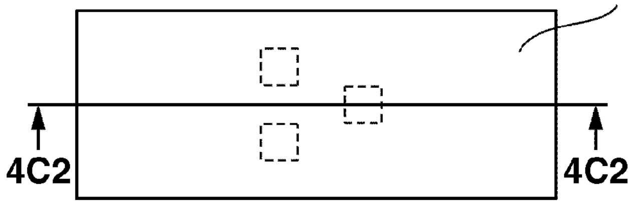
FIG.4C1
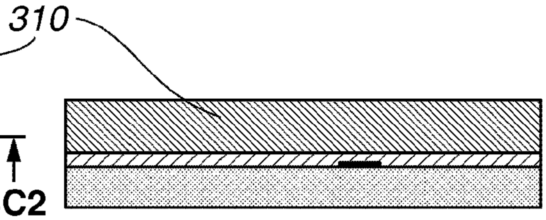
FIG.4C2
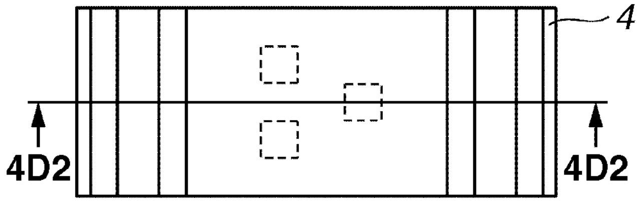
FIG.4D1
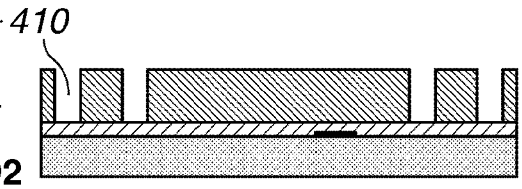
FIG.4D2
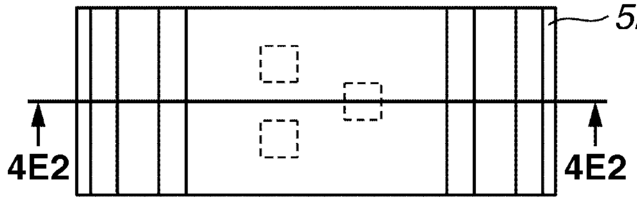
FIG.4E1
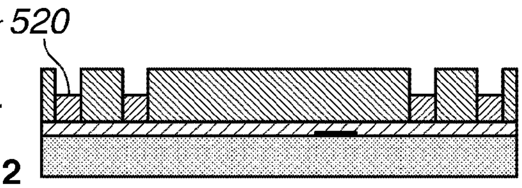
FIG.4E2

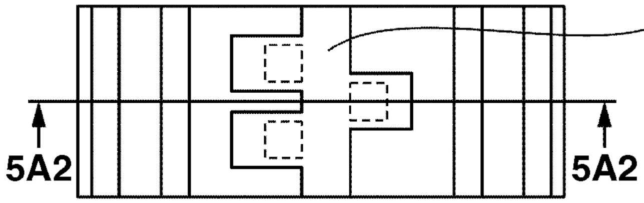
FIG.5A1
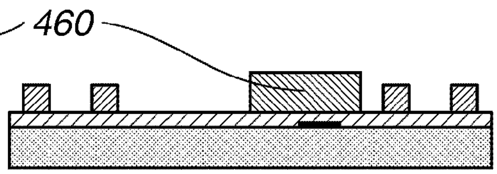
FIG.5A2
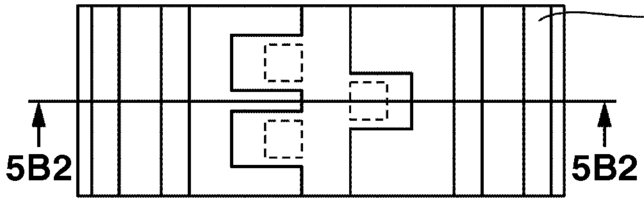
FIG.5B1
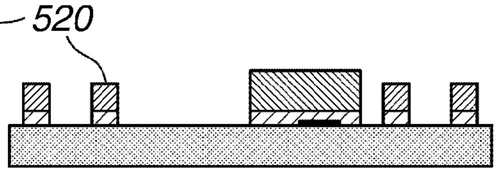
FIG.5B2
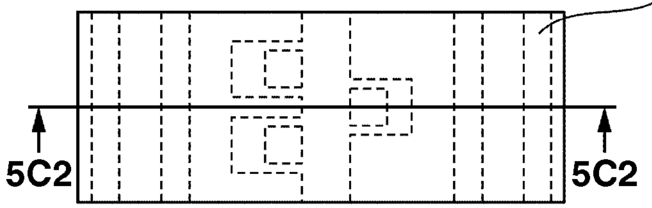
FIG.5C1
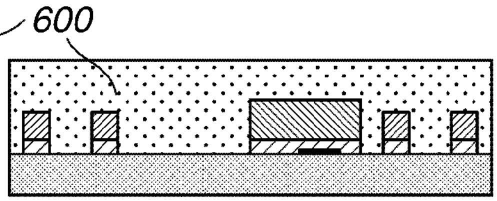
FIG.5C2
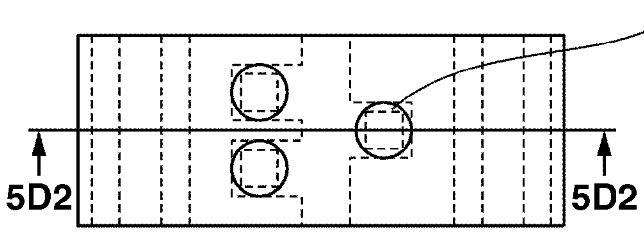
FIG.5D1
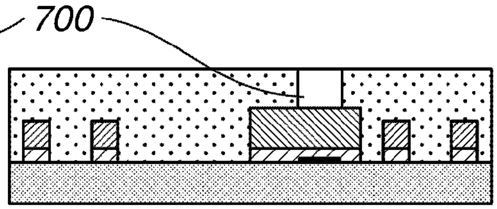
FIG.5D2
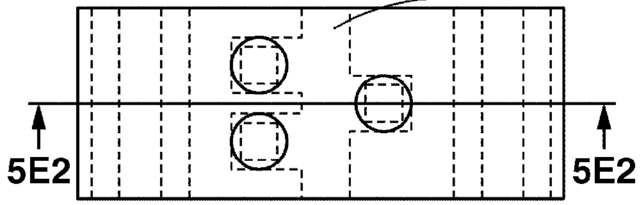
FIG.5E1
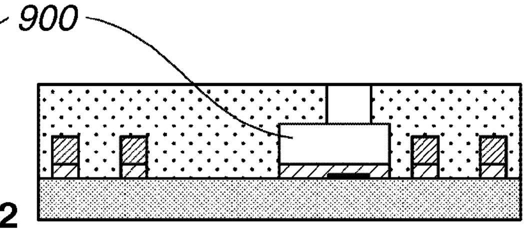
FIG.5E2

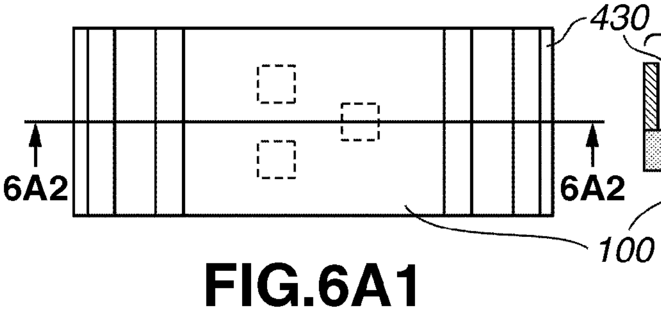
FIG.6A1
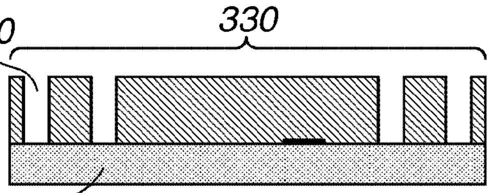
FIG.6A2
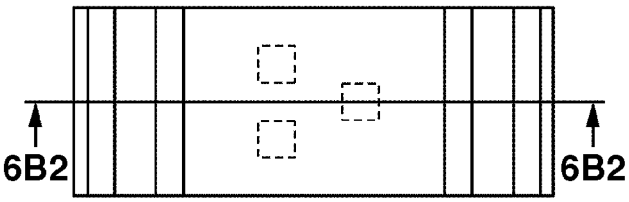
FIG.6B1
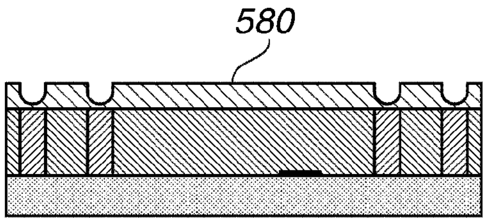
FIG.6B2
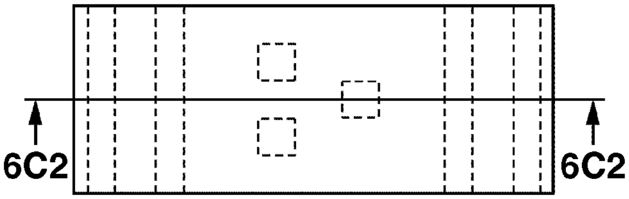
FIG.6C1
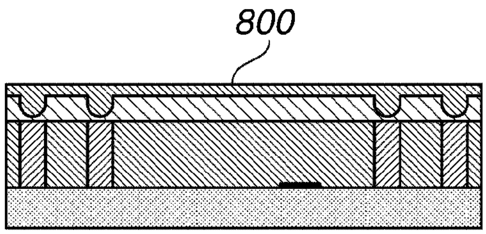
FIG.6C2
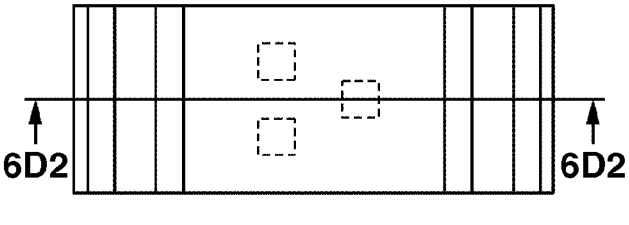
FIG.6D1
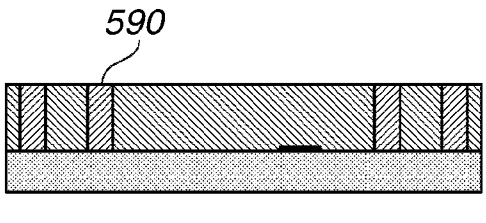
FIG.6D2

METHOD FOR MANUFACTURING LIQUID DISCHARGE HEAD

BACKGROUND OF THE INVENTION

1. Field of the Invention

The present invention relates to a method for manufacturing a liquid discharge head that discharges liquid, and an ink jet recording head that discharges ink to a recording medium for recording.

2. Description of the Related Art

A liquid discharge head for discharging liquid can be applied, for example, to an ink jet recording process in which ink is discharged to a recording medium for recording. An ink jet recording head (hereinafter referred to as a recording head) has a substrate equipped with a plurality of discharging ports from which ink is discharged, a flow path that communicates with each of the discharge ports, a supply port for supplying ink to the flow path, and an energy generation element that adds discharge energy to the ink in the flow path at minimum. A substrate made of silicon (Si) is normally used.

A method for manufacturing such a recording head is discussed in U.S. Pat. No. 5,478,606. The method for manufacturing the same on a substrate in which the energy generation elements are formed, includes steps of 1) forming a flow path pattern with a soluble resin, 2) forming a coating resin layer on the soluble resin layer, which will serve as flow path walls, by solving in a solvent a coating resin containing an epoxy resin that is solid at ordinary temperatures and then solvent-coating the solution on the soluble resin layer, 3) forming discharge ports for discharging ink to the coating resin layer over the energy generation elements, and 4) eluting the soluble resin layer.

Meantime, aluminum (Al) is used as a wiring material for supplying electric power to the energy generation elements in the recording head.

Aluminum (Al) is a common material used as a wiring material for semiconductor elements. A film is formed by a vacuum film forming method such as sputtering and vacuum evaporation, and a wiring pattern is formed by dry-etching and wet-etching, using a resist pattern as a mask.

Recording heads in recent years tend to be manufactured with a greater number of energy generation elements to accelerate printing speed. A number of power supply wirings thus increases, which causes the recording heads to expand their overall width. Since the length and area of the recording heads increase at the same time, these requirements cause increases in manufacturing costs and size of a recording apparatus.

In order to solve such a problem, a power supply wiring with thicker film thickness can be formed on a substrate instead of expanding the width in order to reduce wiring resistance. However, the aforementioned wiring formation (a power supply wiring with thicker film thickness) needs a heavy load in manufacturing.

SUMMARY OF THE INVENTION

The present invention is directed to a method for manufacturing liquid discharge heads capable of effectively and accurately forming power supply wirings with reduced resistance while suppressing process loads.

According to an aspect of the present invention, a method for manufacturing liquid discharge heads that have a substrate on which energy generation elements that generate energy used for discharging liquid are formed, a wiring electrically connected to the energy generation elements, and a flow path that communicates with discharge ports for discharging liquid and corresponds to the energy generation elements. The method includes providing a resin layer on the substrate, forming the first pattern for forming the wiring on the resin layer, forming the wiring on the substrate, using the first pattern forming the second pattern for forming the flow path on the resin layer, forming a coating layer so as to coat the second pattern, and forming the flow path by removing the second pattern.

According to an exemplary embodiment of the present invention, the method can provide liquid discharge heads that reduce wiring resistance and have flow path forming materials with excellent form accuracy. The method can make manufacturing of the liquid discharge heads easy.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A1 to 2E1 and 2A2 to 2E2 are flat views and cross-sectional views illustrating the processes of manufacturing the ink jet recording head according to an exemplary embodiment of the present invention.

FIGS. 3A1 to 3E1 and 3A2 to 3E2 are flat views and cross-sectional views illustrating the processes of manufacturing the ink jet recording head according to an exemplary embodiment of the present invention.

FIGS. 4A1 to 4E1 and 4A2 to 4E2 are flat views and cross-sectional views illustrating the processes of manufacturing the ink jet recording head according to an exemplary embodiment of the present invention.

FIGS. 5A1 to 5E1 and 5A2 to 5E2 are flat views and cross-sectional views illustrating the processes of manufacturing the ink jet recording head according to an exemplary embodiment of the present invention.

FIGS. 6A1 to 6D1 and 6A2 to 6D2 are flat views and cross-sectional views illustrating the processes of manufacturing the ink jet recording head according to an exemplary embodiment of the present invention.

DETAILED DESCRIPTION OF THE EMBODIMENTS

Various exemplary embodiments, features, and aspects of the invention will be described in detail below with reference to the drawings.

Hereinafter, an ink jet recording head (the recording head) is described as an example of a liquid discharge head, but the present invention is not limited to that example. A liquid discharge head can be mounted on a printer, a copier, a facsimile machine having a communications system, a device such as a word processor having a printing unit, and an industrial recording apparatus complexly combined with various processing apparatuses. The liquid discharge head enables users to record data on various recording media such as paper, string, fiber, fabric, leather, metal, plastic, glass, lumber, and ceramic. A term "recording" used herein means adding to a recording medium images such as letters and graphic forms as well as images that have no meanings such as patterns.

Terms "ink" or "liquid" are widely construed to include liquid that is applied to forming images, symbols and patterns, processing recording media, or processing of ink or recording media. Processing of ink or recording media means, for example, improvement of fixity caused by coagulation or insolubilization of color materials in the ink added to the recording media, improvement of recording quality or chromogenic, and improvement of image durability.

Figure 1A:
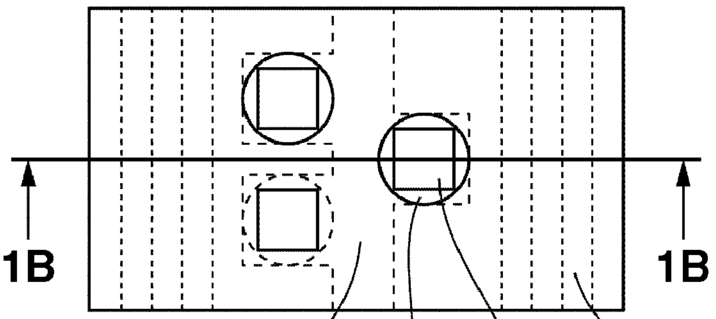
FIGS. 1A and 1B are a flat view of the recording heads according to an exemplary embodiment of the present invention, and a cross-sectional view taken along the line of 1B-1B.
Figure 1B:
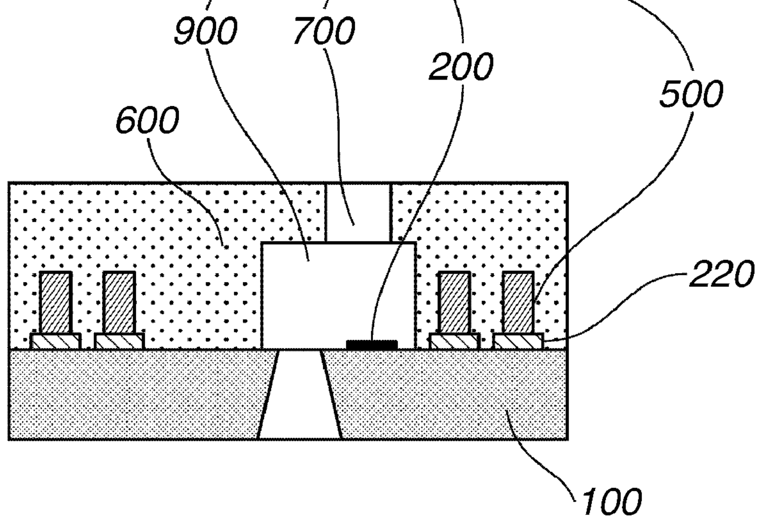
Figure 7:
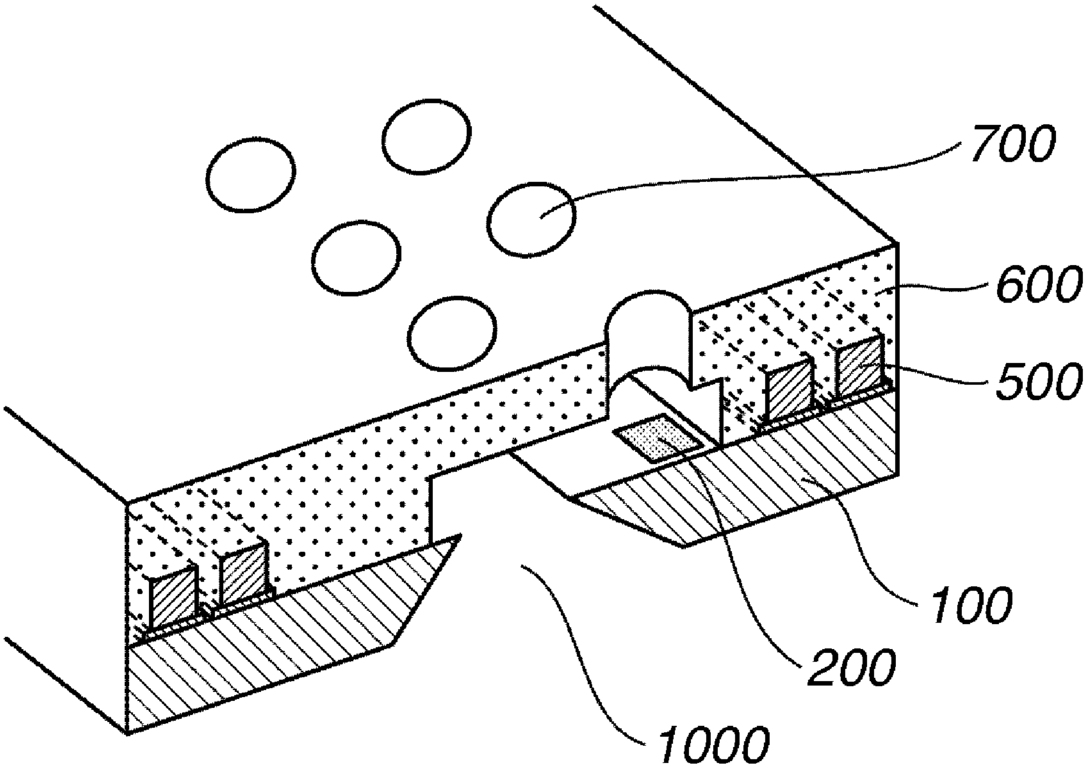
FIG. 7 is a perspective view of the ink jet recording head according to an exemplary embodiment of the present invention.

FIG. 7 is a perspective view of an exemplary embodiment according to the present invention, partially illustrated by cutout. FIG. 1B is a cross-sectional view similar to the cross-section of the recording head illustrated in FIG. 7, while FIG. 1A is a flat view of the recording head as seen from above (in a direction from the discharge ports to the substrate).

The recording head includes a substrate 100 made of silicon (Si), a plurality of discharge ports 700 formed in the substrate 100 for discharging ink, flow paths 900 that communicate with each discharge port 700, and a supply port 1000 that communicates with the flow paths 900. The discharge ports 700 and the flow paths 900 are formed on the surface of the substrate 100 by flow path forming member 600, and the supply port 1000 is formed as a hole that penetrates the substrate 100 from its back surface through its front surface. Ink supplied from the supply port 1000 is supplied to each of the flow paths 900 and discharged from the discharge ports 700 when the ink receives thermal energy generated by an energy generation element 200 which serves as an electrothermal conversion element (heater). The energy generation elements 200 are not limited to the electrothermal conversion elements, but piezo-electric elements can also be chosen and used. Although FIG. 7 illustrates the exemplary embodiment including the discharge ports 700 and the energy generation elements 200 mounted at positions facing each other, the present invention is not limited to this configuration.

A wiring 500 to transfer electric signals for driving the energy generation elements 200 is formed on the surface side of the substrate 100 where the energy generation elements 200 are formed. The wiring 500 is formed with some height on the substrate 100 to reduce electric resistance of the wiring and reduce difference of characteristics among the energy generation elements 200 as well as difference of discharge characteristics among the nozzles. The wiring 500 can be formed, for example, by plating. However, for example, etch-back can also be used as another wiring method. Specifically, metals such as aluminum (Al), gold (Au), and copper (Cu) can be considered as materials suitable for forming the wiring 500.

First Exemplary Embodiment

A method for manufacturing a recording head according to the exemplary embodiments of the present invention will be described with reference to FIGS. 2A1 to 2E1 and 2A2 to 2E2, and FIGS. 3A1 to 3E1 and 3A2 to 3E2.

FIGS. 2A1 to 2E1 and FIGS. 3A1 to 3E1 illustrate flat views similar to that in FIG. 1A, while FIGS. 2A2 to 2E2 and FIGS. 3A2 to 3E2 respectively illustrate cross-sections taken along the lines 2A2 to 2A2, 2B2 to 2B2, 2C2 to 2C2, 2D2 to 2D2, 2E2 to 2E2, 3A2 to 3A2, 3B2 to 3B2, 3C2 to 3C2, 3D2 to 3D2, and 3E2 to 3E2 in FIGS. 1A1 to 2E1 and FIGS. 3A1 to 3E1.

As FIGS. 2A1 and 2A2 illustrate, a heater 200 as an energy generation element is formed on the substrate 100. A silicon substrate is normally manufactured with a plurality of recording heads formed on a silicon wafer as a wafer unit. On a front surface of the heater 200, a 0.3 μm silicon nitride (SiN) protective film is coated according to the first exemplary embodiment (not illustrated herein). On a backside of the substrate 100, a circuit and a pad are formed in advance (not illustrated herein). The circuit is prepared as a power supply wiring for the heater 200. The pad for connecting to an external electrode member is connected to the circuit.

Next, a metal layer 220 used for electrolytic plating is formed as FIGS. 2B1 and 2B2 illustrate. According to the first exemplary embodiment, a titanium (Ti) film 0.1 μm thick and a gold (Au) film 0.2 μm thick are formed sequentially by sputtering.

Then, the metal layer 220 is patterned as FIGS. 2C1 and 2C2 illustrate. The patterned metal layer 220 is further patterned as a wiring pattern for electrolytic plating. The metal layer 220 is prepared in advance on the substrate 100, and connected to the circuit electrically connected to the heater 200.

Furthermore, wirings are connected to each other to form a pattern that expands to an outer circumference of the wafer so that electrical power is supplied from the outer circumference of the wafer when electrolytic plating is performed at a subsequent process. As described later, a pattern width of the metal layer 220 is set larger at this stage than a finished plating wiring pattern, in consideration of an alignment difference. The alignment difference may occur when a resin layer 300 is patterned with a first pattern 400 in the subsequent processes. An etching liquid containing potassium iodides for etching gold (Au), and an etching liquid containing hydrofluosilicic acid for etching titanium (Ti) can be used.

Next, a soluble resin layer is coated over a surface where the heater 200 is mounted on the substrate 100 to form the resin layer 300 as FIGS. 2D1 and 2D2 illustrate. According to the first exemplary embodiment, a positive resist PMER P-AR900 (which is a product name; made by Tokyo Ohka Kogyo Co., Ltd.) is coated in a film of 15 μm thick as a soluble resin.

The resin layer 300 is patterned in a wiring pattern shape to form the first pattern 400 for the wiring as FIGS. 2E1 and 2E2 illustrate.

Next, electroplating is performed to form a wiring 500, using the first pattern 400 as FIGS. 3A1 and 3A2 illustrate. Plating as a wet type metal film forming method can easily form a thick film compared with a vacuum film forming method. Although electroless plating can be also used, electroplating is suitable in terms of process control. For electroplating, gold is a suitable plating material. Since a region that becomes a flow path later is covered with the resin layer 300 at this stage, the region can be protected from plating solutions.

The electric resistivity of gold (Au) is $2.35\times10^{-6}$ Ωcm, which is, for example, lower than the electric resistivity of aluminum (Al) $2.66\times10^{-6}$ Ωcm. In other words, gold (Au) plating has less electric resistivity than that of Al, and power supply wirings with thicker film can be easily formed by the gold (Au) plating, so that influence of voltage drop can be reduced. It can produce a great effect, for example, when a plurality of heaters is actually driven, particularly in cases where some units of heaters are driven as a block. More specifically, a plurality of the blocks can be supplied with electric power from the same electric wiring without dividing the electric power wiring by the number of the driving blocks. Thus, the number of power supply wirings in the recording head can be reduced which results in significant benefit for the overall miniaturization of recording heads and cost reduction.

The preferable (optimum) film thickness of the wiring 500 is about 10 μm. As electroplating liquid, Microfabs Au 660 (which is a product name, made by Electroplating Engineers of Japan Ltd.), for example, can be used.

Next, the resin layer 300 is further exposed and developed to form a second pattern 450 as a mold material for flow path formation as FIGS. 3B1 and 3B2 illustrate. During this formation, the resin layer 300 except the second pattern 450 that is the mold material for the flow path formation is removed from the substrate 100. In a case where the metal layer 220, which connects the wiring with each other for supplying current from the wafer's external circumference at the time of electroplating, becomes an obstacle to the subsequent processes such as dicing, the metal layer 220 can be removed at this stage by etching. As etching liquid for the metal layer 220, an etching liquid containing potassium iodides for gold (Au) and an etching liquid containing hydrofluosilicic acid for titanium (Ti) can be used.

Positive resist can be used for the soluble resin layer 300 to simplify processes. Although the first exemplary embodiment uses a positive resist layer, the layer can also be patterned by dry or wet etching in a case where the layer is not positive resist.

Next, a coating layer 600 is formed on the second pattern 450 as FIGS. 3C1 and 3C2 illustrate. Specifically, resin compositions including solid epoxy resin are dissolved into a solvent at ordinary temperatures to prepare a solution, and then the solution is applied to the second pattern 450 for solvent-coat. The solution can be dried and formed as the coating layer 600, which will be a flow path formation member 600. The coating should be applied to make a film of about 25 μm thickness, together with the soluble resin layer. For resin used as a coating layer, either a photosensitive or non-photosensitive material can be used. In the first exemplary embodiment, the exemplary embodiment is described using a non-photosensitive epoxy resin.

Next, discharge ports 700 are formed on the coating layer 600 as FIGS. 3D1 and 3D2 illustrate. The discharge ports 700 are formed by patterning general positive resist on the coating layer 600, masking, and dry-etching the same.

Then, the second pattern 450 is eluted to form a flow path 900 as FIGS. 3E1 and 3E2 illustrate. The second pattern 450 can be removed, for example, by soaking the wafer into a solution and applying ultrasound waves.

Thereafter, through holes are drilled on the substrate 100 to form supply ports for supplying ink to the flow path 900 (the supply ports are not illustrated in FIG. 3E2). Necessary electrical connections are arranged, and then manufacturing of the recording head is completed. The recording head according to the first exemplary embodiment is mounted on a recording apparatus, which enables to perform high-definition printing.

Second Exemplary Embodiment

The second exemplary embodiment of the present invention is described, with reference to FIGS. 4A1 to 4E1 and 4A2 to 4E2, and FIGS. 5A1 to 5E1 and 5A2 to 5E2.

FIGS. 4A1 to 4E1 and FIGS. 5A1 to 5E1 illustrate flat views similar to that in FIG. 1A, while FIGS. 4A2 to 4E2 and FIGS. 5A2 to 5E2 respectively illustrate cross-sections taken along the lines 4A2 to 4A2, 4B2 to 4B2, 4C2 to 4C2, 4D2 to 4D2, 4E2 to 4E2, 5A2 to 5A2, 5B2 to 5B2, 5C2 to 5C2, 5D2 to 5D2, and 5E2 to 5E2 in FIGS. 4A1 to 4E1 and FIGS. 5A1 to 5E1.

As FIGS. 4A1 and 4A2 illustrate, a heater 200 is formed on a substrate 100 as an energy generation element. A pad is formed on the substrate 100 (not illustrated herein) to connect a gold (Au) plating wiring used as a power wiring for the heater that is formed at a latter stage, and a circuit fabricated in the substrate.

Next, as FIGS. 4B1 and 4B2 illustrate, a 0.3 μm SiN film is coated on a front surface of the heater 200 as a protective layer (not illustrated herein) according to the second exemplary embodiment. A metal layer 240 is formed over the SiN film on the surface. According to the second exemplary embodiment, a tantalum (Ta) film is formed with 0.3 μm thick by sputtering. According to the second exemplary embodiment, the metal layer 240 works as a heater protective layer for improving the durability of the heater as well as a seed layer for plating. The metal layer 240 is formed to obtain sufficient contact with the pad (not illustrated herein) for connecting circuits fabricated in the substrate.

Next, a soluble resin is applied onto the metal layer 240 to form a resin layer 310 as FIGS. 4C1 and 4C2 illustrate. According to the second exemplary embodiment, a positive resist PMER P-AR900 (which is a product name; made by Tokyo Ohka Kogyo Co., Ltd.) is applied in a film 16.5 μm thick to the surface as a mold material. According to the second exemplary embodiment, a designed value for the height of a flow path 900 (from the top most surface of the substrate 100 to the flow path formation member) is 15.0 μm. According to the second exemplary embodiment, the mold material is applied to a film 16.5 μm thick because film thickness will reduce approximately between 0.5 μm to 1 μm in subsequent processes as described below.

Next, the resin layer 410 is shaped in a wiring pattern to form a first pattern 410 for the wiring formation as FIGS. 4D1 and 4D2 illustrate. Gas such as argon (Ar) is used for dry etching of an oxide layer on the surface because stable plating is prevented if the metal layer 240 surface of tantalum (Ta) is oxidized. During this process, a surface of the first pattern 410 for the first wiring formation that is formed on the metal layer 240 is also etched together with the oxide layer on the surface metal layer 240 of tantalum (Ta) as described above. Therefore, it is effective to add in advance to the mold material pattern 410 an additional film thickness that later reduces, to accommodate the flow path height that is finally required. According to the second exemplary embodiment, the film thickness will be reduced by 0.5 μm.

Next, a wiring 520 (plating wiring) is formed by electroplating as FIGS. 4E1 and 4E2 illustrate. An electroplating liquid, for example, Microfabs Au660 (which is a product name; made by Electroplating Engineers of Japan Ltd.) is used, and the plating thickness is 10.5 μm. Although the designed value of the plating wiring height is 10.0 μm according to the second exemplary embodiment, plating of a 10.5 μm film thickness is performed due to the reduction of film thickness by 0.5 μm that occurs in the subsequent processes.

Next, the soluble resin layer patterned as the mold member for the wiring is further patterned so as to become a flow path pattern, and a second pattern 460 is formed as FIGS. 5A1 and 5A2 illustrate.

According to the second exemplary embodiment, the second pattern 460 can be patterned by exposure and development because a positive type photosensitive resin is used for the resin layer 310. The second pattern can be also formed, however, by forming a mask for necessary parts (which will be patterns for the wiring and the flow path) and performing dry etching and wet etching. For example, it is effective in cases where patterning by exposure and development is not stabilized because of ultraviolet irradiation to the resin layer 310 when Ar plasma was previously used in the process of removing the surface oxide tantalum (Ta) layer Next, a metal layer 520 is dry etched with chloride-based gas as FIGS. 5B1 and 5B2 illustrate. During this operation, etching can be performed using the second pattern 460 and the plating wiring 520 as masks. As already described, according to the second exemplary embodiment, the second pattern and the plating wiring are formed considering in advance a reduced volume of film thickness caused by etching (about 1.0 μm for the second pattern, and about 0.5 μm for the metal layer in case of tantalum (Ta)). Of course, etching can also be performed by forming a dedicated etching mask. Manufacturing of the recording head can be completed in similar subsequent processes described in FIGS. 3C1 and 3C2 according to the first exemplary embodiment.

The recording head having a cross-section illustrated in FIG. 1B is obtained by the processes as described above. Furthermore, the processes can be further reduced because the protective layer of the energy generation element (the heater according to the second exemplary embodiment) and the metal layer used for plating can be commonly used.

Third Exemplary Embodiment

The third exemplary embodiment of the present invention is described, with reference to FIGS. 6A1 to 6D1 and 6A2 to 6D2. FIGS. 6A1 to 6E1 illustrate flat views similar to FIG. 1A. FIGS. 6A2 to 6E2 respectively illustrate cross-sections taken along a line 6A2 to 6A2, a line 6B2 to 6B2, a line 6C2 to 6C2, and a line 6D2 to 6D2 according to FIGS. 6A2 to 6D2.

A first pattern 430 is formed on a resin layer 330 in order to form a wiring on the substrate 100, in a manner similar to that in the first or the second exemplary embodiment as FIGS. 6A1 and 6A2 illustrate. Since the third exemplary embodiment uses no plating for the wiring formation, a metal layer for plating is not mounted on the substrate 100.

Next, a metal layer 580 for the wiring such as aluminum is formed on the first pattern 430 so as to embed grooves (spaces) on the first pattern 430 as FIGS. 6B1 and 6B2 illustrate.

Then, a resist 800 is formed to increase the flatness of the surface on the metal layer 580 for the wiring as illustrated by FIGS. 6C1 and 6C2. The resist is etched with a dry etching method such as reactive ion etching (RIE) under the condition that the metal layer 580 and the resist 800 have the same etching rate from the surface. Etching continues until the surface of the resin layer 330 appears, and then the metal remains embedded in a patterned portion for the wiring formation, which becomes a wiring 590.

Manufacturing of the recording head can be completed in the manner similar to the subsequent processes illustrated in FIGS. 3A1 and 3A2 according to the first exemplary embodiment. By such an etch-back method, wiring formation can be implemented using a method that does not involve the plating.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-097224 filed Apr. 3, 2007, which is hereby incorporated by reference herein in its entirety.

What is claimed is:

1. A method for manufacturing liquid discharge heads having a substrate on which energy generation elements that generate energy used for discharging liquid are formed, circuits being mounted on the substrate, a wiring being electrically connected to the energy generation elements by electrically connecting to the circuits, and a flow path communicating with discharge ports for discharging liquid and corresponding to the energy generation elements, the method comprising:

providing a resin layer on the substrate having the circuits electrically connected to the energy generation elements;

forming a first pattern, for forming the wiring, at the resin layer;

forming the wiring on the substrate using the first pattern;

forming a second pattern, for forming the flow path, at the resin layer;

forming a coating layer so as to coat the second pattern; and forming the flow path by removing the second pattern.

2. The method for manufacturing liquid discharge heads according to claim 1, wherein the wiring is formed by gold.

3. The method for manufacturing liquid discharge heads according to claim 1, wherein the discharge ports are formed at positions facing the energy generation elements.

4. The method for manufacturing liquid discharge heads according to claim 1, wherein the second pattern is formed after the wiring is formed.

5. The method for manufacturing liquid discharge heads according to claim 4, further comprising removing all the resin layer, excluding a part of the second pattern, when forming the second pattern.

6. The method for manufacturing liquid discharge heads according to claim 1, further comprising forming the wiring by plating.

7. The method for manufacturing liquid discharge heads according to claim 6, wherein the plating is electroplating.

8. The method for manufacturing liquid discharge heads according to claim 6, further comprising forming the resin layer after forming a metal layer, for the plating, on the substrate.

9. The method for manufacturing liquid discharge heads according to claim 8, wherein circuits electrically connected to the energy generation elements are mounted in advance on the substrate, and the metal layer is electrically connected to the circuits when the metal layer is formed.

10. The method for manufacturing liquid discharge heads according to claim 8, further comprising forming the resin layer after forming a metal layer, for the plating, on the substrate and patterning the metal layer.

11. The method for manufacturing liquid discharge heads according to claim 10, wherein the metal layer is a similar layer to a protective film of the energy generation elements.

* * * * *